(12) United States Patent
Walker et al.

(10) Patent No.: US 6,378,908 B1
(45) Date of Patent: Apr. 30, 2002

(54) HIGH PRESSURE QUICK CONNECTOR

(75) Inventors: Daniel H. Walker, Sylvan Lake; Lyle D. Tincknell, Oxford, both of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/457,210

(22) Filed: Dec. 7, 1999

(51) Int. Cl.$^7$ ................................................ F16L 35/00
(52) U.S. Cl. ........................................ 285/39; 285/321
(58) Field of Search .......................... 285/39, 81, 305, 285/321, 921; 303/116.4

(56) References Cited

U.S. PATENT DOCUMENTS

| | | | |
|---|---|---|---|
| 2,521,127 A | * 9/1950 | Price ...................... 285/321 X |
| 3,404,904 A | * 10/1968 | Roe ........................ 285/305 X |
| 3,944,263 A | * 3/1976 | Arnold .................... 285/921 X |
| 4,021,062 A | * 5/1977 | Mariaulle ..................... 285/39 |
| 4,471,978 A | 9/1984 | Kramer |
| 4,564,221 A | * 1/1986 | Ishii ........................ 285/321 X |
| 4,884,829 A | 12/1989 | Funk et al. |
| 4,895,395 A | * 1/1990 | Ceriani ......................... 285/39 |
| 4,915,136 A | 4/1990 | Bartholomew |
| 4,919,457 A | * 4/1990 | Moretti ......................... 285/39 |
| 5,456,500 A | 10/1995 | Klinger et al. |
| 5,472,016 A | 12/1995 | Szabo |
| 5,486,025 A | 1/1996 | Ketcham |
| 5,538,297 A | 7/1996 | McNaughton et al. |
| 5,711,549 A | 1/1998 | Beans |
| 5,718,459 A | 2/1998 | Davie et al. |
| 5,888,049 A | 3/1999 | Beans |
| 6,073,973 A | * 6/2000 | Boscaljon et al. ............. 285/81 |
| 6,183,020 B1 | * 2/2001 | Luft ........................ 285/321 X |

* cited by examiner

*Primary Examiner*—Lynne H. Browne
*Assistant Examiner*—Greg Binda
(74) *Attorney, Agent, or Firm*—Young & Basile, P.C.

(57) ABSTRACT

A quick connector for connecting fluid lines includes a first connector having a housing for receiving a spool carrying conduit. The spool sealingly engages an endform on the conduit. At least one seal element and a retainer ring are pre-mounted in a bore in the housing and engage the spool to form a seal between the inner surface of the bore in the housing and the spool and to retain the spool in a fully inserted position in the housing. A method of assembling the quick connector is disclosed in which a stuffer pin is preassembled with the retainer ring mounted at a compressed diameter within a retaining collar on one end of the stuffer pin and the seal element mounted the stuffer pin. The stuffer pin is inserted into the bore in the housing until the seal element snaps into one groove in the bore and the retainer ring engages another groove in the bore in the housing. The stuffer pin is removed and a spool having a tapered end portion is slid through the retainer ring causing the tapered portion to expand the retaining ring outward until the retaining ring snaps behind an end shoulder on the spool. A centering collar carried on one of the spool engages an inner surface of the retaining ring to concentrically center the retaining ring with respect to a longitudinal axis through the tube and spool.

5 Claims, 5 Drawing Sheets

HIGH PRESSURE QUICK CONNECTOR

BACKGROUND OF THE INVENTION

1. Field of the Invention

The present invention relates, in general, to high pressure quick connectors employed in fluid conduit systems.

2. Description of the Art

Snap fit or quick connectors have been found to be useful in a wide range of applications. In particular, they are frequently employed for joining fluid carrying conduits in automotive and industrial applications. Such connectors have found general acceptance as they are typically capable of being closed in a single uni-axial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system.

In applications where hazardous material is to flow through a fitting, for example, in vehicle brake lines, prevention of inadvertent release of the quick connector is of primary concern. Accordingly, relatively high axial pull apart strength specifications are mandated. In addition, low insertion forces are required.

Currently, for many high pressure applications, such as with brake lines, threaded fittings are used as connection means. If not aligned correctly, cross threading may result. If excessive torque is applied, over threading may result. As a result of cross-threading or overthreading, the threads are stripped and the fittings must be scrapped and replaced.

In current anti-lock brake systems, the brake lines are connected to a brake manifold or junction during the assembly process of the vehicle. The threaded connections of the prior art are located close together which increases assembly time and labor as well as the potential for error.

A further disadvantage typical of prior art high pressure quick connectors is that they must be assembled with an associated tube and shipped to a final destination as a single assembly. Such shipment is expensive and subjects the connectors to damage from mishandling.

Further, such quick connector designs frequently require the presence of a resilient seal between the outer peripheral surface of the tube and a mating bore which can result in leakage. This is a particular problem with multi-layer, high pressure steel tube typically used in automotive brake lines.

Finally, it is difficult to perform in-process leak checks prior to final installation and very expensive to correct leaks after final installation. Other high pressure quick connects use expensive and costly spring loaded connectors.

Prior high pressure quick connectors have experienced problems with one or more of insertion effort, performance at pressure, the ability to be removed for service, and/or the ability to transport the product from the initial manufacturer to the final user without damage to the quick connector components.

Therefore, it is desirable to provide a quick connector for high pressure system applications which facilitates quick and easy assembly of the quick connector. It is also desirable to provide a high pressure quick connector which eliminates and/or reduces the likelihood of the existing problems encountered with prior art high pressure quick connector designs.

SUMMARY OF THE INVENTION

The present invention is a high pressure quick connector which is usable in interconnecting fluid conduits or elements in a high pressure fluid system.

According to one aspect of the present invention, the quick connector includes a first connector having a bore extending therethrough and a first annular groove opening from the bore and spaced from one end of the first connector. A second connector includes a spool having a bore extending therethrough. An end of a conduit is mounted in the bore in the spool and establishes a fluid flow path through the second connector. At least one and preferably two or more seal elements are mounted in the bore in the first connector and provide a seal between the bore in the first connector and the spool.

A retaining ring is disposed in the first groove in the first connector and has a through aperture. The retaining ring is radially expandable by insertion of the spool therethrough so as to snap-mount the spool in the bore in the first connector upon insertion of the spool to a fully inserted position in the bore in the first connector. A collar is mounted between the spool and the retaining ring for centering the retaining ring with respect to a longitudinal axis extending through the spool.

The collar is mounted on the spool by means carried on the collar and the spool. Preferably, such means comprises an interlocking projection and groove.

According to another aspect of the present invention, another groove is formed in the first connector and opens to the bore in the first connector. At least one of the seal elements has a radially outward extending flange which engages the another groove to mount the seal element in a fixed position within the bore and the first connector.

Preferably, the seal element comprises a resilient seal and a top hat seal elements.

According to another aspect of the present invention, a unique method of assembling a quick connector is discloses. The method comprises the steps of:

pre-mounting the seal element and the retainer ring in the bore in the housing; and    then snap mounting the spool in the bore in the housing.

The method of the present invention further comprises the step of centering the retaining ring with respect to a longitudinal axis extending through the spool when the spool is fully mounted in the bore in the housing. The centering step preferably comprises the steps of providing a collar with a circular outer surface, and mounting the collar over the spool such that the outer surface of the collar engages the retaining ring.

The method of the present invention also defines the step of snap mounting the spool in the housing as including the step of providing the spool with an outwardly tapered surface of expanding the retaining ring from a nominal diameter to an expanded diameter during insertion of the spool through the retaining ring to permit the retaining ring to snap behind an end of the spool upon full insertion of the spool into the bore in the housing.

According to another aspect of the present invention, the step of remounting the seal and retainer ring in the bore in the housing comprises the steps of: mounting the retaining ring in a conical sleeve having inward tapered side walls converging from a first end in which the retaining ring is initially mounted to an opposed second end;

providing an elongated stuffer pin;

mounting a retainer collar over one end of the stuffer pin, the retainer collar having an annular flange with an inner diameter equal to a diameter of the second end of the sleeve;

urging the retaining ring from the first to the second ends of the sleeve to compress the retaining ring while the sliding the retaining ring and the stuffer pin relative to each other to compressively mount the retainer ring about the stuffer pin;

mounting the one seal element on the stuffer pin spaced from the retaining ring;

sliding the stuffer pin into the bore in the housing;

fixing the one seal element in a predetermined position within the bore in the housing;

engaging the retainer ring in an annular groove opening to the bore in the housing wherein the retaining ring expands radially outward from a compressed state; and disengaging the stuffer pin from the seal element and the retainer ring mounted in the bore in the housing.

Preferably, the method of the present invention further comprises mounting a second seal on the stuffer pin adjacent to the first seal.

The quick connector constructed in accordance with the present invention overcomes many of the problems encountered with the previously devised quick connectors for use in fluid systems, particularly high pressure quick connectors. The present quick connector provides a low insertion force, retention at operating pressure, the ability to be easily removed for service as well as the ability to transport the quick connector from the initial manufacturer to the final user without damage to the various quick connector components.

The unique step of premounting the seal elements and the retainer ring within the bore and the housing prevents damage to such components which were previously transported to the use site by means of mounting on the exterior surface of the spool. The present invention uniquely prevents damage to the seal element and the retainer ring as well as any inadvertent loss or separation of the seal element and retainer ring from the quick connector.

The quick connector of the present invention is also easily connected in a snap-together connector between the spool and the female connector at a low insertion force. The unique centering of the retaining ring about a longitudinal axis extending through the spool centers the retention forces on the spool and provides a complete 360° shear surface about the spool to firmly retain the spool within the female connector.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
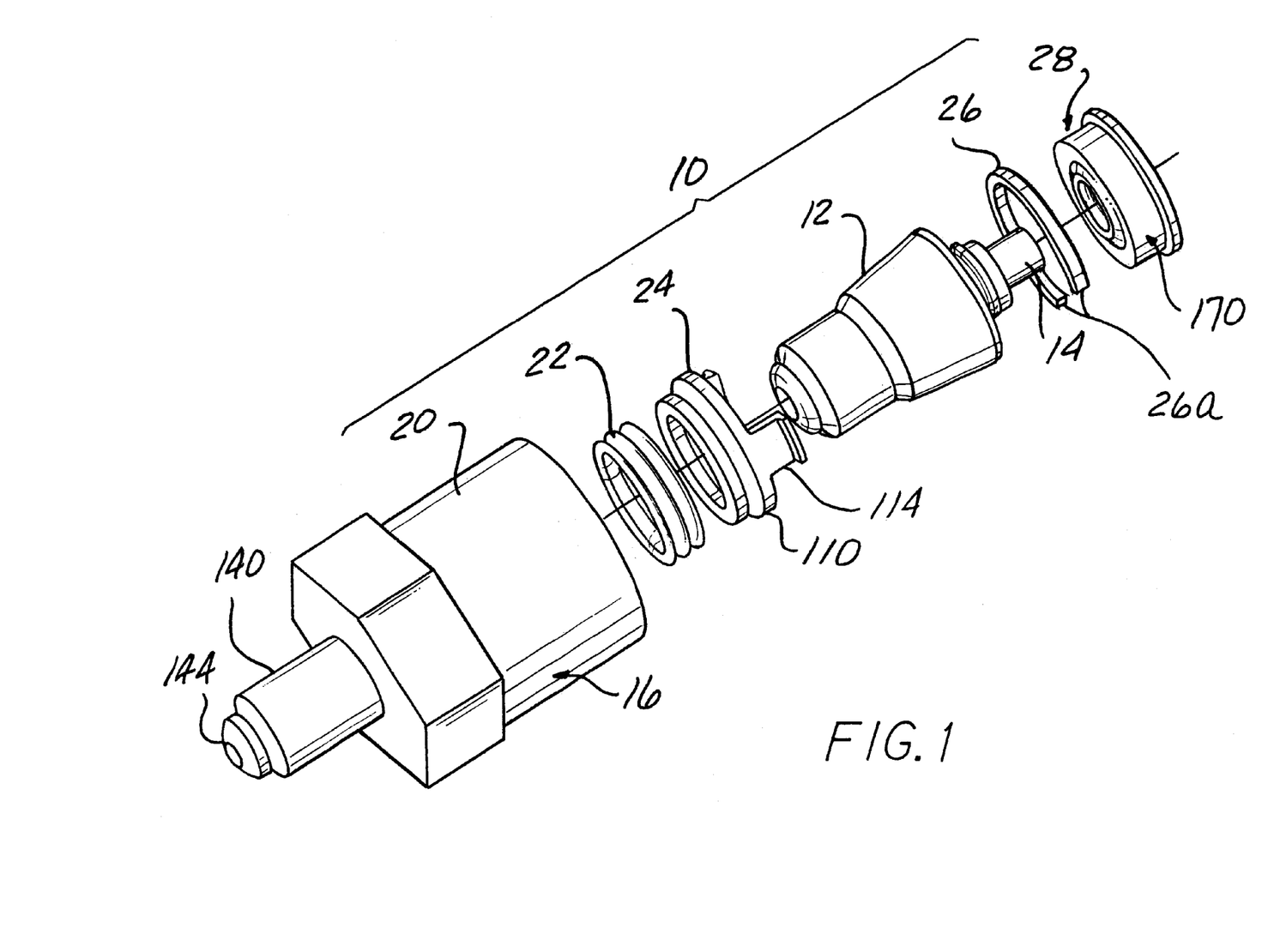
FIG. 1 is an exploded perspective view of the components of a high pressure quick connector according to the present invention.

Referring now to the drawing, and to FIG. 1 in particular, there is depicted the components of a quick connector 10 including a male connector or spool assembly 12 adapted for connecting a tube or conduit 14, such as a brake line tube, to another component, such as a female connector 16.

The female connector 16 may have any applicable exterior configuration depending upon the application. FIG. 1 depicts the female connector 16 in the form of a housing 20 for receiving an in-line brake tube 14. The housing 20, as described hereafter and shown in greater detail in FIGS. 8–10, has an internal bore or, more preferably, a pair of axially aligned stepped bores which receive at least one seal element, such as an O-ring 22, a top hat 24, the spool 12, a spring retainer ring or clip 26, and a centering collar 28.

The external configuration of the housing 20 may change relative to the application. For example, in an anti-lock brake system, brake lines may be connected to a housing in the form of a brake manifold or junction having multiple receiving bores therein. Further, the male connector or spool 12 in the housing 20 is not limited to anti-lock brake systems, but may also be used for any high pressure fluid connection.

Figure 2:
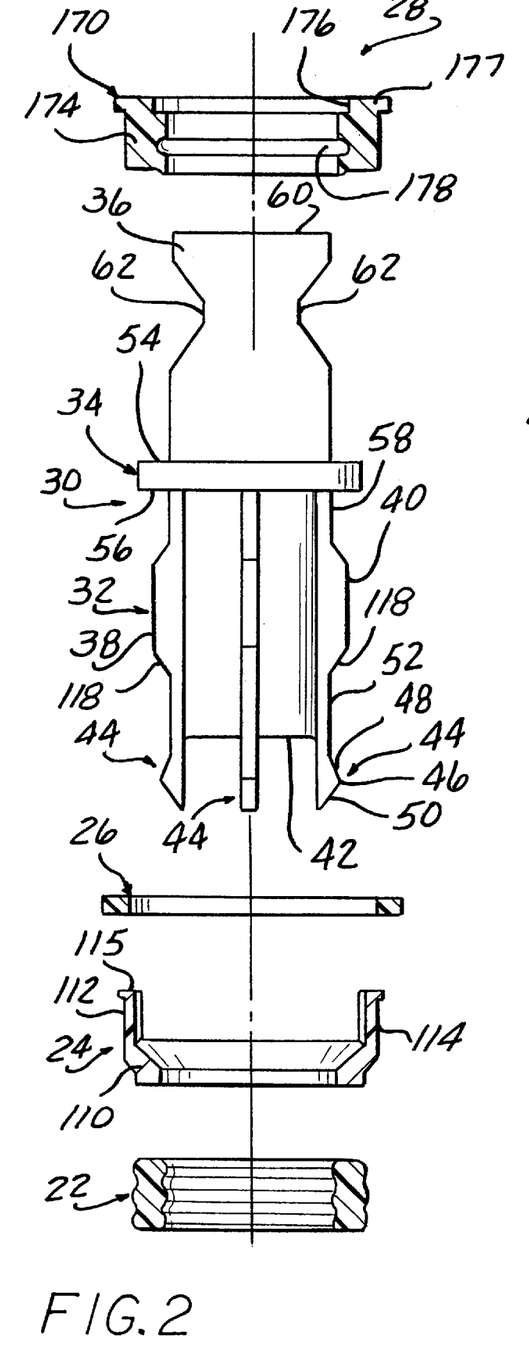
FIG. 2 is an exploded, side elevational view of a stuffer pin having certain quick connector components mountable thereon prior to installation.

According to a unique aspect of the present invention, as shown in FIG. 2, and the assembly sequence of FIGS. 3–8, a stuffer pin 30 is provided for initially mounting the O-ring 22, the top hat 24 and the retaining 26 within the internal stepped bore of the housing 20. This enables such components to be pre-mounted within the housing 20 and protected from damage during shipment from the quick connector manufacturer to the final assembly location. At the assembly location, the spool or male connector 12 is merely inserted into the housing 20 in a snap-in connection to complete the fluid connection between the tube 14 and the bore extending through the housing 20.

As shown in FIG. 2, the stuffer pin 30 is in the form of a one-piece body, preferably formed of a suitable plastic material. The stuffer pin 30 includes a shaft 32, a stop 34, and a handle 36.

The shaft 32 has a tubular elongated shape which may be formed of a single member or, as described in greater detail in U.S. Pat. No. 5,472,016, the entire contents of which are incorporated herein by reference, with at least two and preferably four perpendicularly oriented legs, such as opposed legs 38 and 40 are spaced 90° from adjacent legs and are integrally joined to each other along a common center edge extending along the length of the shaft 32. It will be understood that the shaft 32 may have other shapes, such as a generally solid, cylindrical shape with a smooth outer surface.

The shaft 32 is integrally joined to the stop 34 at a first end. A second end 42 of the shaft 32 extends axially from the first end and the stop 34.

At least one and, preferably, a plurality of resilient arms 44 are integrally formed on and extend axial outward from the second end 42 of the shaft 32. A minimum of two diametrically opposed arms 44 and, preferably, four equally-circumferentially spaced arms 44 are formed on and extend outward from the second end 42 of the shaft 32. Each of the arms 44 is formed with a narrow cross section portion extending from the second end 42 so as to be able to resiliently bend or flex inwardly upon mounting of the O-ring 22 and top hat 24 thereover.

By way of example, each arm 44 has a generally planar inner side wall which is parallel to the longitudinal axis of the shaft 32. The radially outermost surface of each arm 44 has a maximum diameter outer edge 46 which is formed on a second side wall of each arm 44 which is formed of a first inclined surface 48 extending from the second end 42 of the shaft 32 and a second declining outer edge 50 which extends to the outer surface 50 which extends to the outer end of each arm 44.

Seal mounting means are formed on the shaft 32. The seal mounting means comprises an annular recess 52 which extends radially inward between the outermost edge 46 of each arm 44 and a radially enlarged central portion of the shaft 32. The recess 52 cooperates with the outer edge 46 of each arm 44 to define an area for receiving and maintaining at least one seal element, such as the O-ring 22 and the top hat 24 in a mounted position on the stuffer pin 30 prior to assembly into the female connector 16.

The stop 34 is the form of a circular disc or flange and has an outer edge with a outer diameter slightly larger than the outer diameter of the enlarged central portion of the shaft 32. The stop 34 has opposed first and second surfaces 54 and 56 which are in the form of an annulus and project radially outward from the outer surfaces of the adjoining portions of the shaft 32 and the handle 36, respectively.

A reduced diameter annular notch 58 is formed on the exterior surface of the shaft 32 between the enlarged central portion of the shaft 32 and the first surface 54 of the stop 34. The notch 58 forms a retaining ring mounting surface in conjunction with the first surface 54 of the stop 34 as described hereafter.

The handle 36 extends from the stop 34 generally coaxial with the longitudinal axis of the shaft 32. The handle 36 terminates in a flat end portion 60 adjacent to a pair of opposed notches 62 and facilitates manual insertion and withdrawal of the stuffer pin 30 during assembly of the various components thereon as described hereafter.

Mounting of the O-ring 22, the top hat 24, and the retaining ring 26 on the stuffer pin 30 will now be described with reference to FIGS. 3–8.

As shown in FIGS. 3–6, the initial step is to mount the retaining ring 26 on the stuffer pin 30. The retaining ring 26 may be a generally planar ring having a hollow interior opening or aperture 64. For example, a spiral retaining ring manufactured by Smalley as model no. WHM-62-SO2 may be employed. The annular ring portion of the retaining ring 26 is split such that two ends 26a are spaced apart to permit radial expansion and contraction of the retaining ring 26 as described hereafter.

Figure 3:
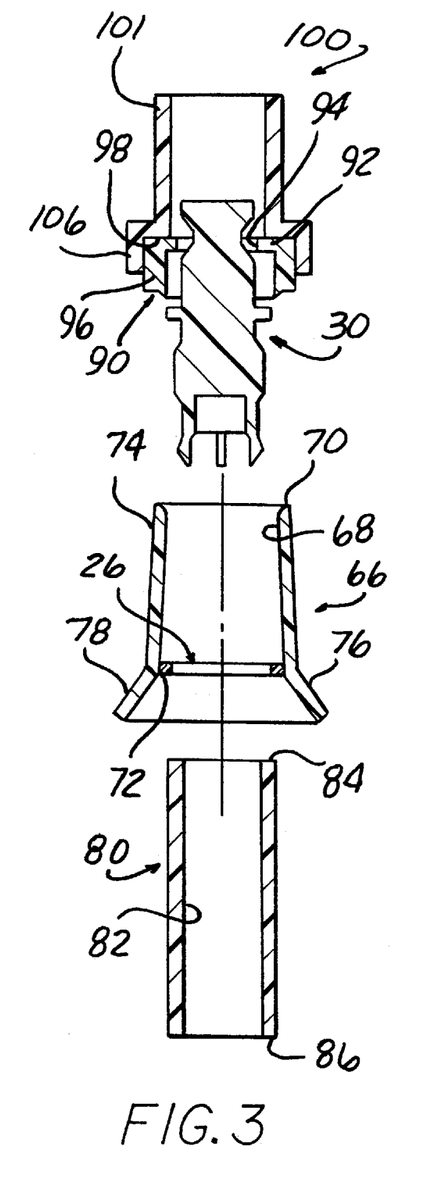
FIGS. 3–8 are side elevational, longitudinally cross-sectioned views of the sequence of loading and unloading seal elements and a retainer ring onto the stuffer pin and from the stuffer pin into a female connector.

As shown in FIG. 3, the retaining ring 26 is inserted into a sleeve 66 having an interior through bore 68 extending between a first end 70 and an opposed second end 72. A first side wall portion 74 of the sleeve 66 tapers from a first smaller diameter at the first end 70 to a larger diameter 76 before flaring outward to form a skirt 78 of even larger diameter which extends to the second end 72.

As shown in FIG. 3, the retaining ring 26 in its expanded position is inserted into the interior bore 68 in sleeve 66 until the retaining ring 26 snugly engages the inward tapering surfaces of the first side wall portion 74 of the sleeve 66 at the first diameter 76.

A pusher 80 is provided for urging the retaining ring 26 over the stuffer pin 30 as described hereafter. The pusher 80 is in the form of a hollow tubular cylindrical member having an interior bore 82 extending between opposed first and second ends 84 and 86.

The first end 84 of the pusher 80 is provided with an inner diameter so as to engage the retaining ring 26 as the sleeve 66 and the pusher 80 are telescopingly engaged so as to slide the retaining ring 26 from the initial mounting position shown in FIG. 3 upward toward the first end 70 of the sleeve 66.

Meanwhile, the stuffer pin 30 is slidably disposed within a retainer collar 90. The retainer collar 90, formed of a suitable plastic, has a bottle-top configuration formed of a planar end portion 92 with a central aperture 94 and a depending annular flange or skirt 96 depending from the outer periphery of the planar portion 92. The aperture 94 is sized to slidably receive the handle 36 of the stuffer pin 30; but is smaller in diameter than the diameter of the stop 34 to prevent the stuffer 30 from sliding through the aperture 94 in the retainer collar 90 past the stop 34. Further, the radially inner end of the skirt 96 has a tapered, depending edge to center the retainer collar 90 on the sleeve 66.

The retainer collar 90 is in turn supported against a shoulder 98 formed at one end of a holder 100. The holder 100 has an internal bore 102 projecting from a first end 104 to the shoulder 98. The outer side wall of the holder 100, which is also formed of a suitable plastic material, terminates in an annular radially extending flange which turns into an axial flange 106 extending generally parallel to the side wall 101. The shoulder 98 forms a seat for the collar 90.

Figure 4:
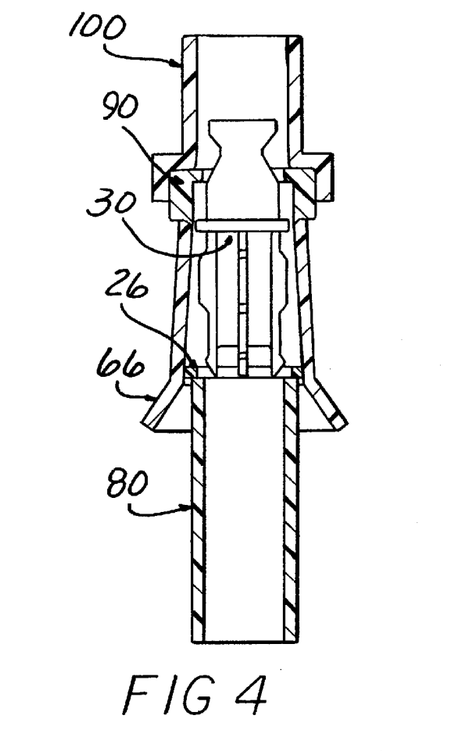

As shown in FIG. 4, the stuffer pin 30 is initially inserted arms 44 first into the hollow end portion of the sleeve 90 with the handle 36 of the stuffer pin 30 projecting through the aperture 94 in the sleeve 90 into the bore 102 in the holder 100. The joined stuffer pin 30, retainer collar 90, and holder 100 as well as the sleeve 66 and the pusher 80 are then urged together to the position shown in FIG. 4 until the end of the retainer collar 90 abuts the end 70 of the sleeve 66. In this position, the first end 84 of the pusher 80 engages the retaining ring 26 mounted within the sleeve 66.

Figure 5:
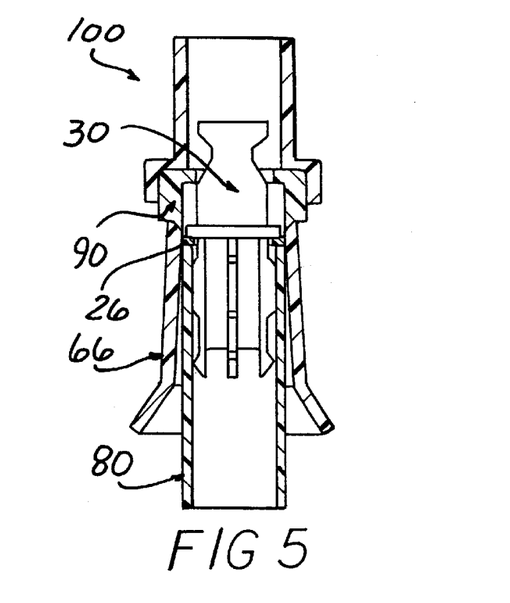

Further compressive force applied on the pusher 80 or the holder 100 advances the retaining ring 26 along the side wall 74 of the sleeve 66 through the intermediate position shown in FIG. 5 until the retaining ring 26 engages the stop 34 on the stuffer pin 30. At the same time, the stop 34 on the stuffer pin 30 engages the inward extending flange on the planar portion 92 of the retainer collar 90 as shown in FIG. 6.

Figure 6:
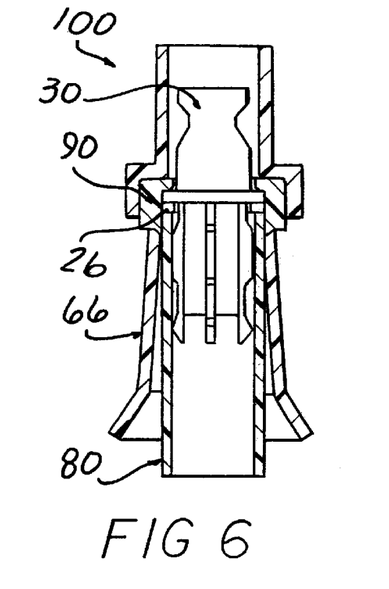
Figure 7:
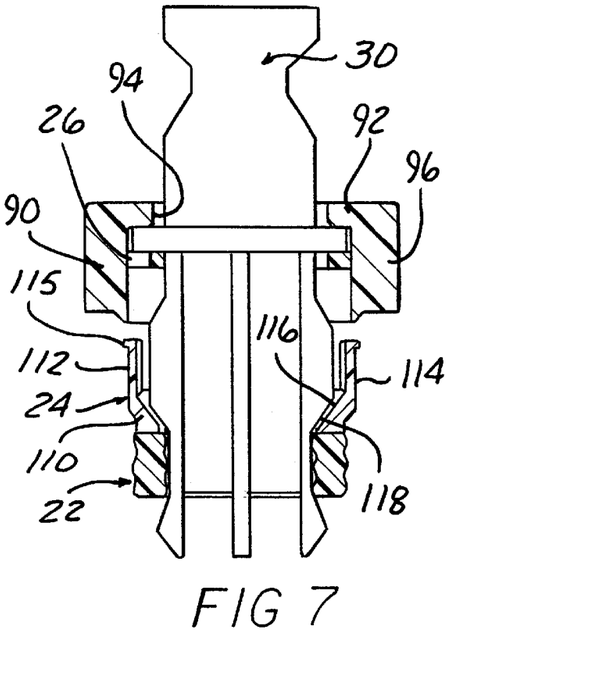

As the pusher 80 urges the retaining ring 26 along the inner surface 68 of the inward tapering first side wall portion 74 of the sleeve 66, the spaced ends 26a of the retaining ring 26 are compressed or urged together thereby compressing the retaining ring 26 into a smallest diameter until the retaining ring 26 reaches the smallest diameter shown in FIGS. 6 and 7 wherein the retaining ring 26 is positioned within the retainer collar 90.

The pusher 80, the sleeve 66, and the holder 100 are then disengaged from the retaining collar 90 and the retainer ring 26 leaving the stuffer pin 30 held within the bore formed within the retainer collar 90 by the axially extending flange 96 by the compressed retaining ring 26, as shown in FIG. 7. In this position, the stop 34 on the stuffer pin 30 is sandwiched between the inward extending portion of the planar end 92 of the retainer collar 90 and the compressed retaining ring 26.

The top hat 24, which is formed with an annular ring portion 110 and a pair of axially extending legs 112 and 114 each terminating in a radially outward extending flange 115, is then mounted over the arms 44 on the stuffer pin 30 by bending the outer edge portion 46 of the arms 44 inward until the inner diameter of the bore through the ring portion 110 of the top hat 24 passes thereover enabling the top hat 24 to be slid along the recess 52 until an inward conical seat 116 formed between the ring portion 110 and the legs 112 and 114 engages a mating conical seat 118 formed on the stuffer pin 30 between the recess 52 and the enlarged diameter portion of the shaft 32. The seal element 22, such as an O-ring or multi-lip seal is then urged over the arms 44 and seated in the recess 52 between the ring portion 110 of the top hat 24 and the first inclined surface 48 of each arm 44 on the stuffer pin 30. The stuffer pin 30 carrying the top hat 24 and the O-ring 22, and the retaining ring 26 in the retainer collar 90 is now ready for insertion into the female connector 16 as shown in FIG. 8.

Figure 8:
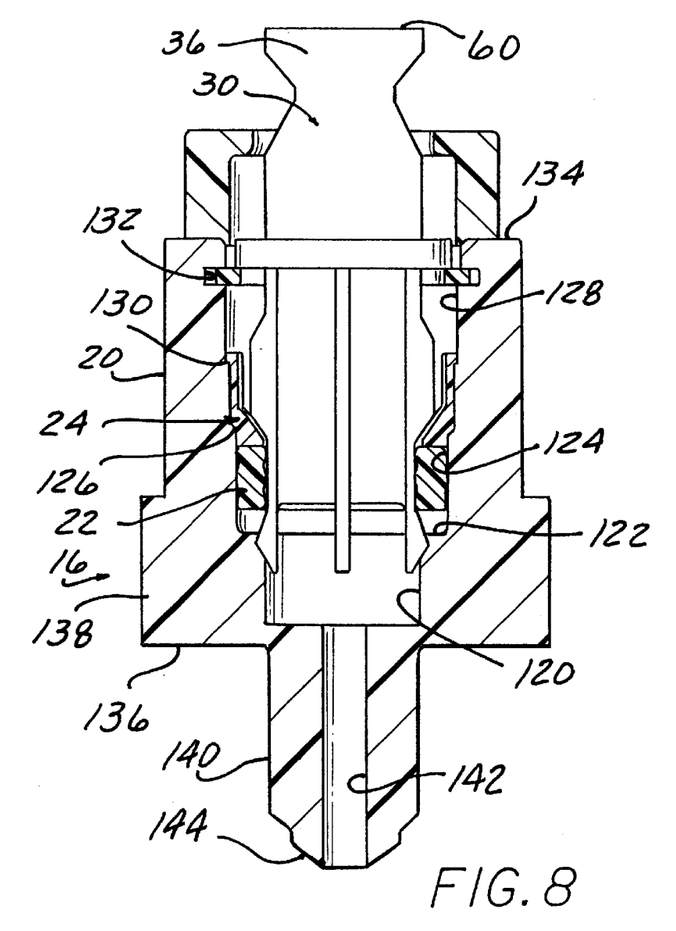

As shown in FIG. 8, the housing 20 of the female connector 16 is formed with a first stepped bore 120 of a first diameter. A shoulder 122 is formed at one end of the first stepped bore 120 and extends radially outward from the inner surface of the first bore 120 and merges into a second stepped bore 124 of a second, larger diameter. An outward inclined, generally conical surface 126 is formed at one end of the second bore 124 and extends radially outward to form a third stepped bore 128 of a third diameter. A first annular groove 130 is formed in the third stepped bore 128 between opposite ends thereof. A second annular groove 132 is formed in the third stepped bore 128 adjacent one end 134 of the housing 20.

An opposed second end 136 is formed adjacent an enlarged diameter end portion of the housing 20. Preferably, the enlarged diameter end portion 138 is formed with a plurality of hex flats.

In an exemplary aspect of the invention, an elongated tubular shank 140 projects from the second end 136 of the housing 20. A bore 142 extends through the shank 140 to an exterior end 144 of the shank 140. The bore 142 is disposed in fluid communication with the first stepped bore 120 in the housing 20. External threads may be formed on the shank 140 for mounting the shank 140 and the entire housing 20 in an external component, not shown. Alternately, the shank 140 may be formed with a smooth exterior surface and provided with an outer diameter for an interference fit in a bore in an external component. Further, the entire housing 20, with or without the shank 140, may be integrally formed as a unitary part of another external component.

With the stuffer pin 30 assembled as shown in FIG. 7, the stuffer pin 30 is inserted, arms 44 frontmost, into the open end of the third stepped bore 128 in the housing 20 of the female connector as shown in FIG. 8. The insertion of the stuffer pin 30 continues until the radially outward flanges 115 on the legs 112 and 114 of top hat 24 snap into the first groove 130 in the housing 20. At substantially the same instant, the retainer ring 26 is disposed in line with to the second groove 132 in the housing 20 and expands radially outward into the second groove 132 bringing the outer portions of the retainer ring 26 into the second groove 132 thereby trapping the retainer ring 26 in the second groove 132. This halts further possible insertion of the stuffer pin 30 into the housing 20. However, as shown in FIG. 6, the expanded O.D. of the retaining ring 26 is less than the O.D. of the second groove 132, allowing some sideways play or movement of the retaining ring 26 within the second groove 132.

The stuffer pin 30 is then removed from the housing 20 by grasping the handle 36 and pulling the stuffer pin 30 axially away from the retainer ring 26. The enlarged outer edge 46 on the arms 44 of the stuffer pin 30 engage the O-ring 22 causing the arms 44 to bend radially inward permitting the arms 44 to pass through the narrow diameter bore in the O-ring 22 as well as the bore in the ring portion 110 of the top hat 24. Similarly, the arms 44 bend inward when engaging the inner surfaces of the retaining ring 26 until the stuffer pin 30 is free of the housing 20. It should be noted that the I.D of the retaining ring 26, when in the expanding position, is larger than the enlarged portion of the shaft 32 permitting the stuffer pin 30 to pass freely therethrough.

Figure 9:
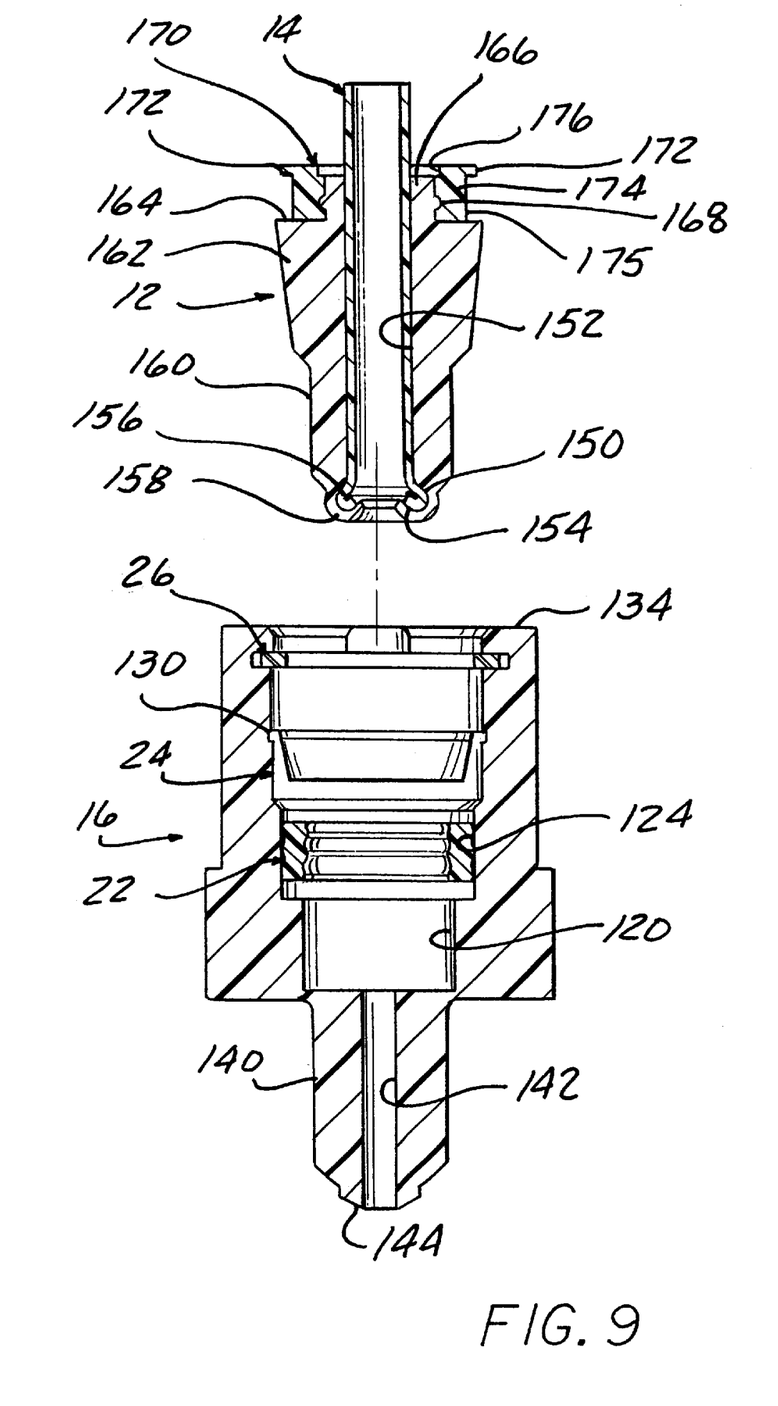
FIG. 9 is an exploded, side elevational, longitudinally cross-sectioned view of the female connector and spool after installation of the seal elements in the female connector.
Figure 10:
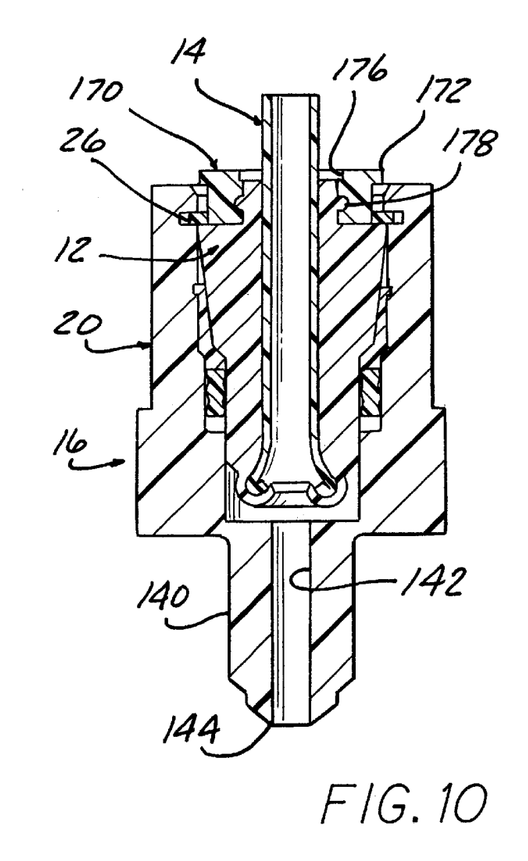
FIG. 10 is a side elevational, longitudinally cross-sectional view of the assembled quick connector of the present invention.

Referring now to FIGS. 9 and 10, the insertion of the spool 12 which carries the tube 14 into the female connector 16 will be described. The spool 12 is in the form of a tube retainer which positively engages a flared end or endform 150 at one end of the tube 14. The spool 12 is generally in the form of a cylindrical body having a through bore 152 extending between opposed ends. The bore 152 has a generally constant diameter cross section which merges at one end with a conical, radially outward extending seat 154. The conical surface or seat 154 is formed complementary in shape to a conical flange 156 on the tube endform 150 for positively attaching the spool 12 to the conduit or tube 14. By example, one end 158 of the spool 12 is rolled over the end of the conical flange 156 at one end of the tube 14 to form a tight, metal-to-metal seal between the tube 14 and the spool 12.

Extending from the rolled over end 158, the body of the spool 12 tapers outwardly to a first constant diameter portion 160. Generally intermediate the opposed ends of the spool 12, the body tapers further outwardly at a first angle and then at a shallower angle to form a tapered portion 162 which extends to an end shoulder 164. A smaller diameter neck 166 projects centrally from the end shoulder 164. The neck 166 is concentric with the bore 152 and has an outwardly extending, annular flange 168 formed intermediately between the end of the neck 166 and the end shoulder 164.

A centering collar 170 is mounted on the spool 12 generally in contact with the end shoulder 164 and the outer surface of the neck 166. The centering collar 170, which may be formed of a suitable plastic, has a generally annular end flange 172 and a smaller diameter center portion 174 projecting therefrom. A bore 176 extends through the end flange 172 and the center portion 174 for receiving the neck 166 of the spool 12 and the tube 14 therethrough as shown in FIG. 9. The center portion 174 has a generally circular outer surface 175 of a predetermined diameter. The collar 170 can also have an outer surface formed of a plurality of radially extending, equal length arms.

An annular, inward opening groove 178 is formed in the center portion 174 of the centering collar 170 for snap connection to the flange 168 on the neck 166 of the spool 12 to mount the centering collar 170 on the spool 12.

During assembly, the spool 12 carrying centering collar 170 and the tube 14, as described above, is then inserted into the first, second, and third stepped bores 120, 124, and 128 in the housing 20 of the female connector 16 as shown in FIG. 10. The spool 12 is inserted into the bores in the housing 20 a sufficient distance until the radially outward extending flange 115 on the top hat 24 snaps into the first groove 130 in third stepped 128 in the housing 20. This locks the top hat 24 in position within the stepped bores of the housing 20 and enables the top hat 24 to retain the seal or O-ring 22 within the second stepped bore 124 to form a seal between the inner surface of the second stepped bore 124 of the housing 20 of the female connector 16 and the outer surface of the constant diameter portion 160 of the spool 12.

During the insertion of the spool 12 into the stepped bores in the housing 20, the tapered portion 162 of the spool 12 will eventually engage the inner surface of the retaining ring 26 which is loosely disposed in the second groove 132 in the housing 20. The outward tapering surface of the tapered portion 162 causes the spaced ends 26a of the retaining ring 26 to expand radially outward allowing passage of the large diameter end of the tapered portion 162 past the retaining ring 26. At this point, the retaining ring 26 snaps under spring force over the end shoulder 162 in the spool 12 into contact with the exterior surface 175 of the end flange 172 on the centering collar 170. The diameter of the exterior surface 175 of the centering collar 170 is selected such that the retaining collar 26 remains under spring force and is concentric with the longitudinal axis of the spool 12 and the tube 14. This creates a complete 360° shear surface between the retaining ring 26 and the spool 12 to distribute forces on the spool 12 evenly about the circumference of the spool 12 to securely retain the spool 12 in the housing 20 of the female connector 16.

When it is necessary to service the quick connector of the present invention or the components connected to the tube 14 and/or the female connector 16, the centering collar 170 is popped out of the end of the housing 20. With the centering collar 170 removed from the end of the bore in the housing 20, the retaining ring 26 can be pulled out of the second groove 132 thereby enabling the entire spool 12 to be removed from the stepped bores in the housing 20. A new stuffer pin 30, preassembled with the O-ring 22, top hat 24, retaining ring 26, retainer collar 90, and centering collar 170, and a new spool 12, may be employed to mount the seal elements 22 and 24 in the retaining ring 26 on the housing 20 of the female connector 16 as well as permitting the spool body 12 and the new centering collar 170 to be snap mounted in the stepped bore of the housing 20 by the retaining ring 26 in the same manner as described above.

In summary, there has been disclosed a unique fluid quick connector which has particular advantageous use in high pressure fluid connector applications. By the unique use of a stuffer pin to pre-mount the seal elements and the retainer ring in the housing or body of the female connector, the spool and tube can be shipped from the manufacturer to the final assembly site without a large number of external components mounted thereon. This minimizes potential damage to such components and/or prevents their loss or disengagement from the tube or spool during shipping.

The quick connector of the present invention also provides a simple push-in, snap connection between the spool and the female connector. This provides an advantageous low insertion force; while still having the requisite high pullout force resistance required for high fluid pressure applications.

The unique centering collar maintains the retainer ring or clip centered about the end of the spool thereby creating a complete 360° shear surface distributing connection forces equally about the circumference of the spool and the retainer ring.

Finally, the largest diameter of the tapered portion of the spool body is greater than the nominal inside diameter of the retaining clip in a relaxed position. In this manner, if the spool is not fully inserted into the stepped bore in the housing of the female connector to the seated position wherein the retainer clip snaps behind the end shoulder on the spool body, the expansion forces between the retainer ring and the tapered surface of the spool body will tend to eject the spool body from the bore in the housing to prevent any partial insertion of the spool in the female connector.

What is claimed is:

1. A quick connector assembly comprising:

a first connector having a bore extending therethrough and a first annular groove opening from the bore and spaced from one end of the first connector;

a second connector including a spool having a bore extending therethrough, an end of a conduit fixedly mounted in the bore in the spool and establishing a fluid flow path through the second connector;

at least one seal element mounted in the bore in the first connector and providing a seal between the bore in the first connector and the spool;

a retaining ring disposed in the first groove in the first connector, the retaining ring having a through aperture, the retaining ring being radially expandable by insertion of the spool therethrough so as to snap mount the spool in the bore in the first connector upon insertion of the spool to a fully inserted position in the bore in the first connector; and an annular collar carried by the spool and mounted on the spool in a manner to maintain a central axis of the annular collar coaxial with a longitudinal axis of the spool, the collar positioned between the spool and the retaining ring for centering the retaining ring with respect to the longitudinal spool axis.

2. The quick connector of claim 1 wherein the collar includes an annular outer surface that is positioned radially inwardly of the bore of the first connector, the annular outer surface engageable with the retaining ring to center the retaining ring with respect to the longitudinal spool axis.

3. The quick connector assembly of claim 1 wherein the collar has a circular outer surface concentric with the central collar axis engagable with the retaining ring to center the retaining ring with respect to the longitudinal spool axis.

4. A quick connector assembly comprising:

a first connector having a bore extending therethrough and a first annular groove opening from the bore and spaced from one end of the first connector;

a second connector including a spool having a bore extending therethrough, an end of a conduit mounted in the bore in the spool and establishing a fluid flow path through the second connector;

at least one seal element mounted in the bore in the first connector and providing a seal between the bore in the first connector and the spool;

a retaining ring disposed in the first groove in the first connector, the retaining ring having a through aperture, the retaining ring being radially expandable by insertion of the spool therethrough so as to snap mount the spool in the bore in the first connector upon insertion of the spool to a fully inserted position in the bore in the first connector; and a collar mounted between the spool and the retaining ring for centering the retaining ring with respect to a longitudinal axis extending through the spool;

a second groove being formed in the first connector and opening in the bore in the first connector;

the seal element including a first seal having a radially outward extended flange, the radially outward extending flange engageable with the second groove to mount the first seal in a fixed position within the bore in the first connector.

5. The quick connector of claim 4 wherein the seal element further comprises:

a resilient second seal interposed between the first seal and one end of the bore in the first connector.

* * * * *